Dec. 19, 1967 P. O. DAHLMAN ET AL 3,359,370

IDEALLY LOSSLESS RESONANT TRANSFER OF ENERGY BETWEEN BANDPASS FILTERS OF EQUAL BANDWIDTH

Filed June 5, 1964 2 Sheets-Sheet 1

INVENTORS
P. M. THRASHER
P. O. DAHLMAN

BY [signature]
AGENT

United States Patent Office 3,359,370
Patented Dec. 19, 1967

3,359,370
IDEALLY LOSSLESS RESONANT TRANSFER OF ENERGY BETWEEN BANDPASS FILTERS OF EQUAL BANDWIDTH

Per O. Dahlman, Bethesda, Md., and Paul M. Thrasher, Falls Church, Va., assignors to International Business Machines Corporation, New York, N.Y., a corporation of New York Filed June 5, 1964, Ser. No. 372,874
5 Claims. (Cl. 179—15)

ABSTRACT OF THE DISCLOSURE

A circuit for effecting an essentially lossless resonant transfer of energy from a first bandpass filter to a second bandpass filter; and a multichannel switching system including a first plurality of bandpass filters, a second plurality of bandpass filters, and switch means interconnecting one of said first plurality of bandpass filters to one of said second plurality of bandpass filters for effecting essentially lossless resonant transfer of energy between said interconnected bandpass filters.

*Specification*

The invention herein described was made in the course of or under a contract with the United States Air Force.

This invention relates to electronic switching circuits and more particularly to circuits for switching information between bandpass filters by resonant transfer techniques. Resonant transfer in general relates to the ideally lossless transfer of energy between two circuits on a resonant basis. Resonant transfer as used in this application refers to the provision of a voltage at a reference time across a first capacitor of a first tuned circuit equal to a voltage across a second capacitor of a second tuned circuit at some later time.

Information switching is of particular importance in modern communication systems. It is more commonly called circuit switching when used in voice communication systems. In such systems provision must be made for handling two types of messages; for example, local and long distance. Incoming signals on local lines must be switched to either an outgoing local line or a long distance line (hereafter referred to as a trunk line). Similarly incoming long distance signals must be switched to either outgoing local lines or trunks. Due to the transmission frequencies employed, local lines are connected to other local lines by low pass filters. That is, an incoming local line feeds a low pass filter on the input side of a switching circuit; that, in turn, is connected to an output low pass filter, and then to an outgoing local line. Trunks are to be connected to other trunks by a pair of bandpass filters. Due to the limitations of prior art equipment—more fully described hereafter—such a connection between bandpass filters could not be made without the provision of expensive frequency division multiplex components on both the input side of the switching circuit and the output side. This frequency division multiplex equipment, requiring a number of components, does add to the expense of the communication system.

Accordingly, it is a general object of this invention to eliminate the disadvantages associated with current bandpass to bandpass circuit switching.

Another object of this invention is to provide a resonant transfer circuit capable of transferring energy directly between bandpass filters.

A more particular object of this invention is to accomplish circuit switching between incoming and outgoing trunks by means of a resonant transfer circuit.

Still another object of this invention is to provide a resonant transfer circuit capable of transferring energy directly between bandpass filters in an essentially lossless fashion.

Another object of this invention is to provide a resonant transfer circuit, connecting bandpass filters, in which energy transmission is solely unidirectional.

Yet another object of this invention is a switching circuit of the type described in which the energy of all the harmonics is passed during the energy transfer.

Still another object of this invention is the provision of a resonant transfer circuit, interconnecting bandpass filters, which is unaffected by the presence of said filters during its operation.

Briefly stated, the invention comprises a resonant transfer circuit interconnecting an input and an output bandpass filter. The resonant transfer circuit comprises a first LC tank circuit joined to a first terminal. Joined also to that terminal is a first inductor. The first inductor is connected by switch means to a second inductor. The second inductor joins, at a second terminal, a second LC tank circuit.

In operation, an incoming signal passes through the input bandpass filter. The switch means in the resonant transfer circuit is held open until the incoming information signal charges a capacitor in the first LC tank circuit. At the precise instant that the first LC tank circuit becomes charged, the switch means is closed. The first LC tank circuit then discharges through the switch means and current flows in the resonant transfer circuit. The second LC tank circuit accepts a charge. Since, at the time of switch closure, the capacitor in the first LC tank circuit was charged and the capacitor in the second LC tank circuit was completely discharged, the energy flow is completely unidirectional; i.e., from input to output side. There is a complete transfer of energy from input to output. After the energy transfer has taken place, the switch means is opened. The capacitor in the first LC tank circuit is now recharged, while the capacitor in the second LC tank circuit now discharges through the output bandpass filter. Thus, the incoming information signal has been transferred directly from one bandpass filter to another without any material diminution of the signal.

This invention offers a number of distinct advantages. In particular, the resonant transfer circuit enables an information signal to be transferred directly from one bandpass filter to another—without initially demodulating the information signal, passing it through two low pass filters, and then subsequently modulating the signal. All the frequency division multiplex equipment, previously required on trunks to demodulate the information signal and then to modulate the signal, has been eliminated—and this has resulted in substantial savings. These savings in components and time would be meaningless, if the technical performance of the equipment was drastically decreased. However, utilization of this invention results in an entirely satisfactory operation of the entire communications system in a simpler fashion.

In summary, then, the technical performance of the entire communication system is maintained at a high level, while the necessary equipment has been pared to a minimum amount.

The foregoing and other objects, features and advantages of the invention will be apparent from the following more particular description of the invention as illustrated in the accompanying drawings.

Figure 1:
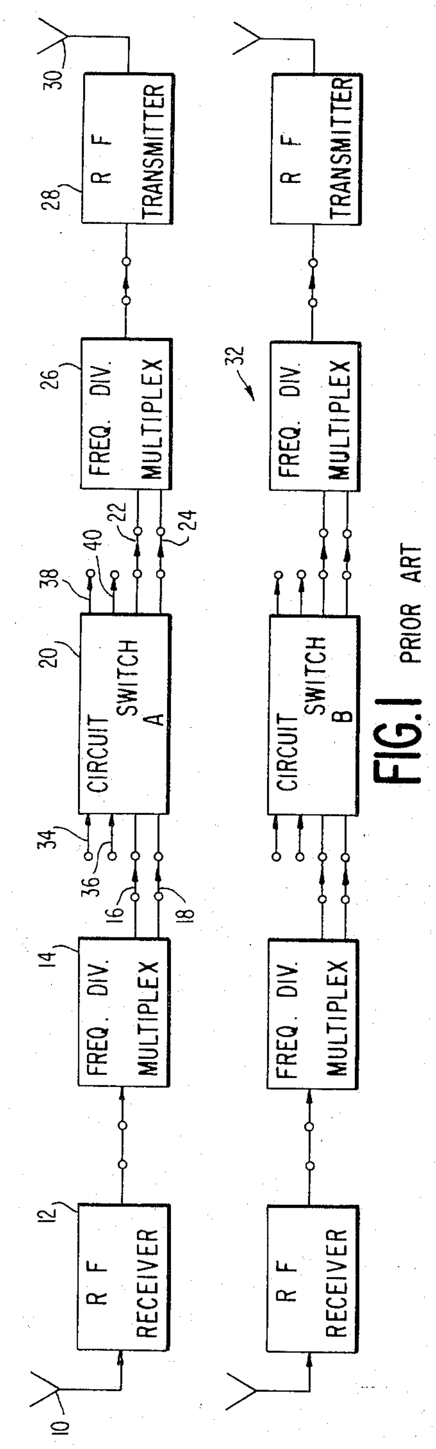
FIG. 1 shows a system diagram of prior art voice communication systems.

Turning now to FIG. 1, a system diagram showing in block form the major components of a prior art voice communication system appears. Antenna 10 and RF receiver 12 accept an incoming audio signal and pass it on to frequency division multiplex equipment 14. Here, the frequency of the incoming information signal is shifted down from a bandpass region to a low pass region. This base band signal is conveyed on one of the input trunks 16, 18 to a switching circuit 20. Switching circuit 20, as will become apparent later, contains a number of low pass filters on both the input and output side; these may be selectively interconnected. The low pass filters convey the base band signal to one of the outgoing trunks 22, 24. The base band signal enters frequency division multiplex equipment 26 where it is heterodyned to its outgoing frequency slot. This signal then passes on to RF transmitter 28 and antenna 30. The information may then be sent via a RF communication link to a similar arrangement of components shown as group 32. The above process can be repeated in group 32 and similar groups not shown until the information arrives at its ultimate destination.

It should be noted in FIG. 1 that the prior art equipment has the capacity of switching incoming local messages on lines 34, 36 to outgoing local lines 38, 40. However, this is not of significance in understanding the instant invention and will not be described further.

Figure 2:
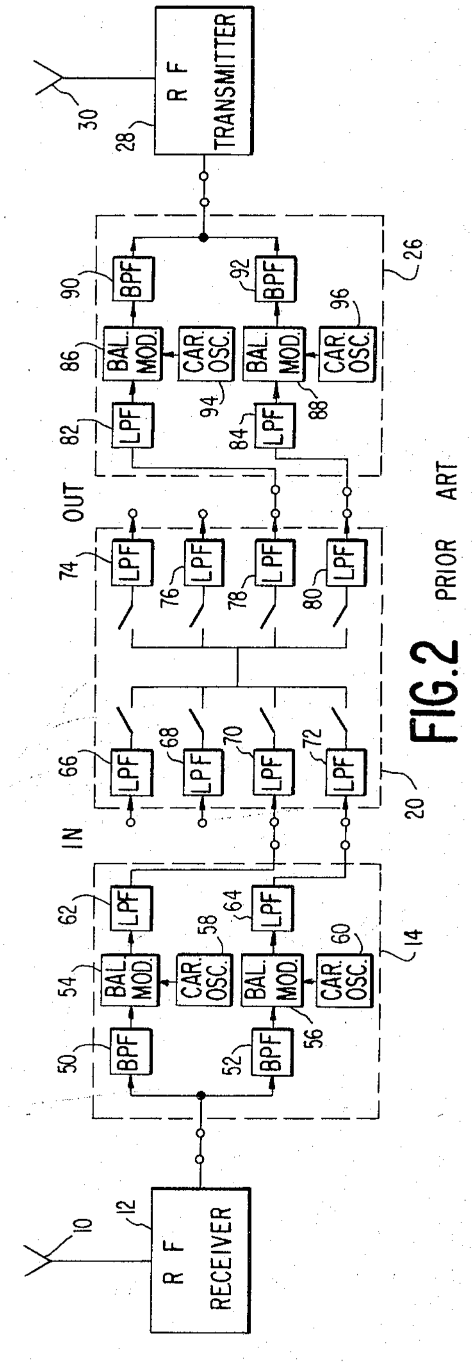
FIG. 2 shows certain portions of FIG. 1 in more detail.

In FIG. 2, certain prior art elements shown in FIG. 1 are presented in detail. Frequency division multiplex equipment 14 is shown within dotted lines. The information signal received by antenna 10 and RF receiver 12 is fed to one of a plurality of parallel band pass filters 50, 52. Actually, typical equipment may have any number "*n*" of such bandpass filters. Each bandpass filter 50, 52 feeds an associated balanced modulator 54, 56 which in turn are fed by carrier oscillators 58, 60. The coaction of a balanced modulator with a carrier oscillator essentially steps down the frequency of the incoming information signal to a base band so that an associated low pass filter 62, 64 may further transmit the signal through the system.

With continued reference to FIG. 2, the prior art switching circuit 20 is shown in dotted lines. It comprises a discrete number of low pass filters 66, 68, 70, 72 on the input side selectively interconnected by switching means to a plurality of low pass filters 74, 76, 78, 80 on the output side. Low pass filters 66, 68 can transfer an incoming local message to an outgoing local line via low pass filters 74, 76. However, one of the low pass filters 70, 72 is used to transmit the base band signal to one of the low pass filters 78, 80. This signal then enters frequency division multiplex equipment 26 shown in dotted lines. The components within frequency division multiplex equipment 26 are symmetrical counterparts of those within frequency division multiplex equipment 14; (e.g., a plurality of low pass filters 82, 84; balanced modulators 86, 88; bandpass filters 90, 92; and carrier oscillators 94, 96). The base band signal is shifted to its outgoing frequency slot as it passes through frequency division multiplex equipment 26 and is then passed on to RF transmitter 28 and antenna 30 as noted previously.

Thus, summarizing the prior art system shown in FIG. 1 and FIG. 2, the necessity of first beating down an incoming information signal and then beating back up the same information signal becomes apparent since a conventional time division switching center can only transmit base band signals. Further, an initial investment in the components necessary to fabricate frequency division multiplex equipment 14 and 26 is necessary. These disadvantageous factors may be removed by utilizing the instant invention.

Figure 3:
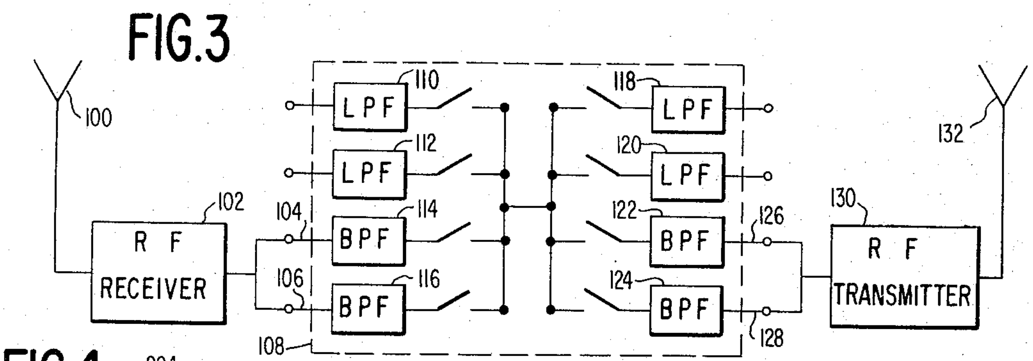
FIG. 3 shows a switching circuit employing the resonant transfer circuit of this invention.

FIG. 3 shows a voice communication system utilizing the resonant transfer circuit of the instant invention. An incoming message is received by antenna 100 coacting with RF receiver 102 and distributed to an available incoming trunk 104, 106. Trunks 104, 106 enter switching circuit 108. Switching circuit 108 comprises a plurality of low pass filters 110, 112 and band pass filters 114, 116 on the input side. Only two of each type filter are shown for simplicity, but more can be provided. On the output side of switching circuit 108 there are a plurality of low pass filters 118, 120 as well as bandpass filters 122, 124. In order to switch a channel, any one of filters 110, 112, 114, 116 on the input side of switching circuit 108 may be selectively interconnected to any one of filters 118, 120, 122, 124 on the output side. Bandpass filters 122, 124 on the output side of switching circuit 108 are connected via trunks 126, 128 to RF transmitter 130 and antenna 132.

With continued reference to FIG. 3, it is noticeable that no frequency division multiplex equipment is present on either the input or the output side of switching circuit 108. In order to eliminate that equipment, it is necessary to dispose the resonant transfer circuit of this invention between each bandpass filter 114, 116 on the input side and bandpass filter 122, 124 on the output side. Once the inventive circuit has been so placed, it then becomes possible to connect the bandpass filters on the input side to those on the output side, and transfer energy from one to the other ideally without an energy loss.

Figure 4:
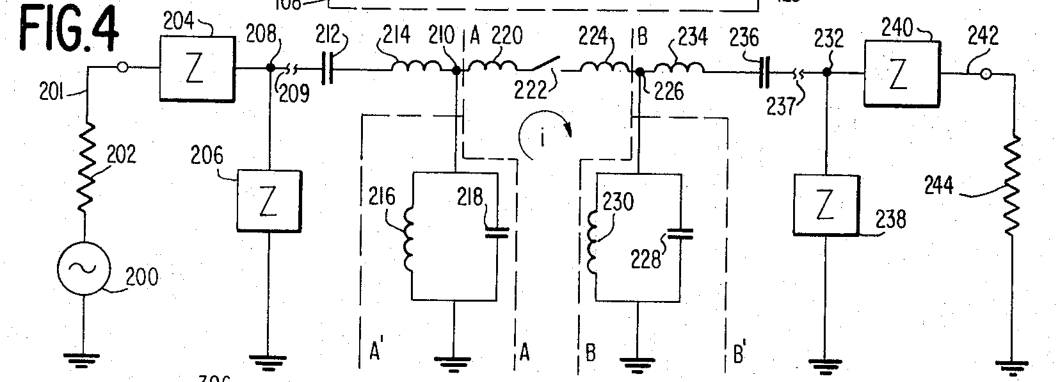
FIG. 4 shows, in detail, the resonant transfer circuit of this invention serving to transfer energy between a pair of bandpass filters.

FIG. 4 of the drawings shows the resonant transfer circuit of this invention connecting an input bandpass filter to an output band pass filter. A source of information signals 200 having generator impedance 202 supplies an information signal voltage through trunk 201 to impedance 204. Connected to impedance 204 is a second impedance 206 shunted to ground; impedances 204 and 206 would have their characteristics determined by the amplitude and frequency of the information signal. Other impedances may be added to tailor the filtering characteristics of the circuit—as shown by the break at 209. Impedances 204 and 206 are both connected to terminal 208. Connected in series between terminal 208 and terminal 210 are capacitor 212 and inductor 214. An LC tank circuit comprising inductor 216 and capacitor 218 are also connected to terminal 210. Inductor 220 extends between terminal 210 and switch means 222. Switch means 222 is normally open.

With continued reference to FIG. 4, inductor 224 is connected on the opposite side of switch means 222 and is tied to terminal 226. A second LC tank circuit, comprising capacitor 228 and inductor 230 also joins terminal 226. Connected in series between terminal 226 and terminal 232 are inductor 234 and capacitor 236. Joined also to terminal 232 are impedances 238 and 240. Additional impedances may be added here to tailor the filtering characteristics as shown by break 237. Running from impedance 240 is an outgoing trunk 242 having a load impedance 244.

Thus, with further reference to FIG. 4, those components to the left of line A—A comprise an input band pass filter. Similarly those components to the right of dotted line B—B comprise an output bandpass filter. Switch means 222 when closed enables an incoming information signal to be transferred ideally without energy loss from an input bandpass filter to an output bandpass filter. The theory of this transfer will now be more fully explained.

Figures 5, 6:
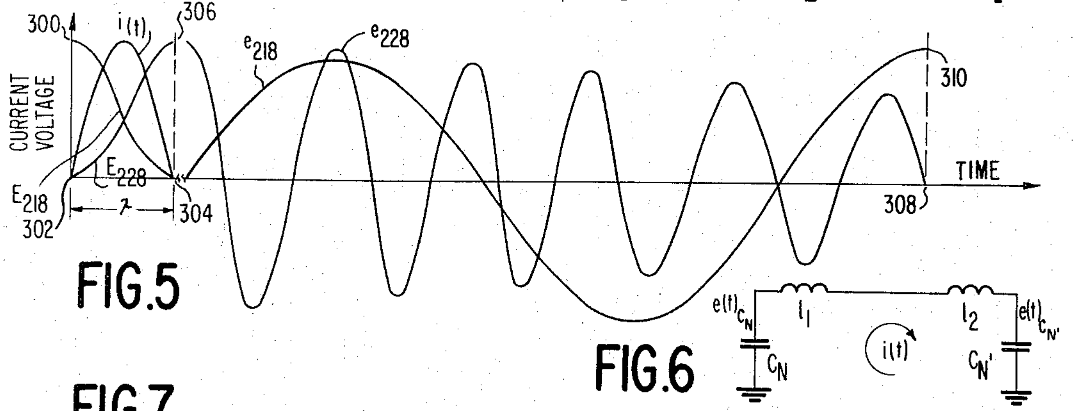
FIG. 5 is a plot of the operating characteristics of the circuit shown in FIG. 4.
FIG. 6 is an equivalent circuit for the resonant transfer circuit of this invention.

FIG. 5 is a plot of characteristics for the resonant transfer circuit of FIG. 4. As noted before, with reference to FIG. 4, the incoming information signal is provided from a source 200 and, after wending its way through impedances 204, 206, capacitor 212 and inductor 214, the signal arrives at capacitor 218—charging that capacitor to the input voltage level. In FIG. 5 the charge upon capacitor 218 at a reference time is shown at point 300. At the same time, it should be noted that capacitor 228 has no charge; this has been previously dissipated. The absence of charge on capacitor 228 is indicated at point 302 in FIG. 5. The closing of switch means 222 initiates current flow $i(t)$, represented by curve $i(t)$ in FIG. 5, in the series circuit comprising capacitor 218, inductor 220, switch means 222, inductor 224 and capacitor 228. Essentially, the charge on capacitor 218 is being transferred, by means of this current flow, to capacitor 228. The discharge of voltage from capacitor 218 during switch closure is plotted against time as curve $E_{218}$. The complete discharge of capacitor 218 is shown at point 304 on FIG. 5. The charge of voltage transferred to capacitor 228 during switch closure is plotted against time as curve $E_{228}$, and the charge on capacitor 228 is shown at point 306. The time defined by the interval between point 302 and point 304 in FIG. 5 is referred to as $\tau$ and represents the sampling pulse width. The transfer of energy from capacitor 218 to capacitor 228 has been complete in that energy flow was unidirectional; there was no reverse current flow from capacitor 228 to capacitor 218 since capacitor 228 had no charge upon it when switch means 222 was closed. Further, during time $\tau$, the series circuit comprising elements 218, 220, 222, 224, 228 was essentially isolated from the rest of the components on either side; this isolation is brought about by the presence of inductor 214 on the input side and inductor 234 on the output side. After the energy transfer has been completed, switch means 222 is then opened.

With continued reference to FIG. 5, a substantial period of time elapses before the next sampling period arrives—note the broken time ordinate—and its arrival is indicated at point 308 on FIG. 5. During the time interval between sampling periods (i.e., between point 304 and point 308 on FIG. 5) a charge builds once again on capacitor 218 in an oscillatory manner; this is represented by the curve labeled $e_{218}$. The accumulation of the maximum charge upon capacitor 218 is shown at point 310 on FIG. 5. During that same interval of time, the charge on capacitor 228 is removed in an oscillatory fashion and this is shown by the curver labeled $e_{228}$ in FIG. 5. The point in time at which complete discharge of capacitor 228 occurs is shown at point 308 on FIG. 5. The oscillatory nature of curves $e_{218}$ and $e_{228}$ are determined by the frequency characteristics of the bandpass filters; the curves shown are representative of an input bandpass filter joined to an output bandpass filter having a higher frequency pass spectrum than the input filter. Points 308 and 310, indicating the time at which there is an absence of charge on capacitor 228 and a maximum charge on capacitor 218 respectively, mark the beginning of a second sampling pulse. Switch means 222 then closes, and the process of energy transfer is repeated.

It should be recognized that the resonant transfer circuit set forth in FIG. 4 represents an arrangement that may be universally applied to transferring energy between a pair of bandpass filters. Inpedances 204, 206, inductors 214, 216, and capacitors 212, 218 comprise an input bandpass filter; their values depend upon the frequencies to be passed. The principles of filter design are well known in the art and will not be further expounded here. In a like manner, impedances 238, 240, inductors 234, 230, and capacitors 236, 228 comprise an output bandpass filter and their particular values may be designed in accordance with the frequencies to be passed by them; their values for a particular application may also be determined by utilizing well-known principles of filter design. In order to insure a resonant transfer of voltage from the output of the input bandpass filter to the input of the output-bandpass filter, the following general conditions have been found sufficient:

(1) Capacitor 218, inductor 220, switch means 222, inductor 224, and capacitor 228 should form a series resonant circuit resonating at $f_0$ equal to ½ $\tau$ (where $\tau$ is the sampling pulse width).

(2) The capacitance of capacitor 218 should equal the capacitance of capacitor 228.

(3) The impedance offered to the transient by capacitor 218 should be significantly less than the impedance of inductor 214 at $f_0$.

(4) The impedance offered to the transient by capacitor 228 should be significantly less than the impedance of inductor 234 at $f_0$.

(5) The impedance offered to the transient by inductor 220 should be significantly less than the impedance of inductor 214 at $f_0$.

(6) The impedance offered to the transient by inductor 224 should be significantly less than the impedance of inductor 234 at $f_0$.

(7) In the time between sampling intervals the voltage across capacitor 218 shall rise from zero to the level of the input voltage signal.

(8) In the time between sampling intervals the voltage across capacitor 228 shall drop to zero from the level of the input voltage signal.

(9) $f_0$ must be much greater than the region of the associated bandpass filter.

Before discussing an embodiment of this invention, the theory behind the resonant transfer of information will be presented. FIG. 6 shows an equivalent circuit for those components within the region formed by lines A–A′ and B–B′ of FIG. 4. Since it is an equivalent circuit, component values will be labeled in general terms so as to fit in with the subsequent mathematical analysis. Accordingly, in FIG. 6 there is shown a capacitance $C_N$ connected in series to inductance $l_1$ and $l_2$; these in turn are series-connected to a second capacitance $C'_N$. Further, FIG. 6 represents the equivalent circuit during time $\tau$. The problem here is to examine the variation of the voltage across $C_N$ as a function of time; this voltage may be labeled $e(t)_{C_N}$ and it has an initial value of $q_0/C_N$. Further, the voltage across capacitance $C'_N$ must be examined and this may be expressed as $e(t)_{C'_N}$. It has an initial value of 0. The last item to be examined is the current $i(t)$ through the circuit.

The equation describing the condition of the circuit in FIG. 6 when the switch is closed may be written:

$$\frac{q_0}{C_N}-\frac{1}{C_N}\int_0^t i(t)dt-\frac{1}{C'_N}\int_0^t i(t)dt-l_1\frac{di(t)}{dt}-l_2\frac{di(t)}{dt}=0 \qquad (1)$$

The LaPlace transform of all terms of Equation 1 yields:

$$\frac{q_0}{sC_N}-\frac{1}{sC_N}\mathcal{L}[i(t)]-\frac{1}{sC'_N}\mathcal{L}[i(t)]-sl_1\mathcal{L}[i(t)]-sl_2\mathcal{L}[i(t)]=0 \qquad (2)$$

$\mathcal{L}[i(t)]=I(s)$ may be solved for and the inverse transform taken, yielding $$i(t)=\frac{\dfrac{q_0C'_N}{l_1C_NC'_N+l_2C_NC'_N}}{\sqrt{\dfrac{C_N+C'_N}{l_1C_NC'_N+l_2C_NC'_N}}}\left[\sin\sqrt{\frac{C_N+C'_N}{l_1C_NC'_N+l_2C_NC'_N}}\,t\right] \qquad (3)$$

$E(s)_{C'_N}$ may be obtained from the relationship $$E(s)_{C'_N}=I(s)Z(s)_{C'_N} \qquad (4)$$

where $$Z(s)_{C'_N}=\frac{1}{sC'_N}$$

When $E(s)_{C'_N}$ is obtained in this manner and the inverse transform taken, the result is $$e(t)_{C'_N}=\frac{q_0}{(C_N+C'_N)}\left[\cos 1-\sqrt{\frac{C_N+C'_N}{l_1C_NC'_N+l_2C_NC'_N}}\,t\right] \quad (5)$$

It remains to determine $e(t)_{C_N}$. Note that $e(t)_{C_N}$ may be expressed $$e(t)_{C_N}=\frac{q_0}{C_N}-\frac{1}{C_N}\int_0^t i(t)dt \quad (6)$$

or $$e(t)_{C_N}=\frac{q_0}{C_N}-\mathcal{L}^{-1}I(s)Z(s)_{C_N} \quad (7)$$

where $$Z(s)_{C_N}=\frac{1}{sC_N}$$

$i(s)Z(s)_{C_N}$ may be determined and the inverse transform taken. This, then, is subtracted from $q_0/C_N$ in accord with Equation 7, yielding $$e(t)_{C_N}=\frac{q_0}{C_N}-\frac{q_0C'_N}{(C_N+C'_N)C_N}\left[1-\cos\sqrt{\frac{C_N+C'_N}{l_1C_NC'_N+l_2C_NC'_N}}\,t\right] \quad (8)$$

Equations 3, 5, and 8 completely describe the voltage and current relationships within the circuit of FIGURE 6 in terms of the four circuit parameters and the initial voltage on $C_N$, or $q_0/C_N$. If Resonant Transfer is defined in terms of having the voltage across $C'_N$ at time $\tau$ equal the initial voltage across $C_N$ at time zero, which is the usual requirement, certain conclusions may be drawn. Mathematically, this condition may be stated $$[e(t)_{C_N}]_{t=0}=[e(t)_{C'_N}]_{t=\tau} \quad (9)$$

This simply means that the voltage appearing across $C_N$ at the moment of switch closure is completely transferred, so that it appears across $C'_N$ at the moment the switch opens, which occurs $\tau$ seconds later. By substituting for $e(t)_{C_N}$ and $e(t)_{C'_N}$ in Equation 9, the following expression results $$\frac{q_0}{C_N}-\frac{q_0C'_N}{(C_N+C'_N)C_N}\left[1-\cos\sqrt{\frac{C_N+C'_N}{l_1C_NC'_N+l_2C_NC'_N}}\,t\right]_{t0=}=\frac{q_0}{(C_N+C'_N)}\left[1-\cos\sqrt{\frac{C_N+C'_N}{l_1C_NC'_N+l_2C_NC'_N}}\,t\right]_{t=\tau} \quad (10)$$

Consideration of Equation 10 will show that two auxiliary conditions must apply in order to make the above equality true. There are (a) $$\sqrt{\frac{C_N+C'_N}{l_1C_NC'_N+l_2C_NC'_N}}\,\tau=\pi$$

(b) $$C_N=C'_N$$

It is convenient to rewrite Equations 3, 5, and 8 with the simplification of condition (b) incorporated $$i(t)=\frac{\dfrac{q_0}{C_N(l_1+l_2)}}{\sqrt{\dfrac{2}{C_N(l_1+l_2)}}}\left[\sin\sqrt{\frac{2}{C_N(l_1+l_2)}}\,t\right] \quad (11)$$

$$e(t)_{C'_N}=\frac{q_0}{2C_N}\left[1-\cos\sqrt{\frac{2}{C_N(l_1+l_2)}}\,t\right] \quad (12)$$

$$e(t)_{C_N}=\frac{q_0}{C_N}-\frac{q_0}{2C_N}\left[1-\cos\sqrt{\frac{2}{C_N(l_1+l_2)}}\,t\right] \quad (13)$$

It is of interest to further examine condition (a) above. Note that condition (a) may be written in terms of the series resonant frequency, $f_0$, of the circuit; i.e., $$f_0=\frac{1}{2\tau}=\frac{1}{2\pi}\sqrt{\frac{C_N+C'_N}{l_1C_NC'_N+l_2C_NC'_N}} \quad (14)$$

This shows that in order to achieve Resonant Transfer the series circuit must be tuned to a frequency of the reciprocal of twice the duration of the sampling time, the switch is closed.

Figure 7:
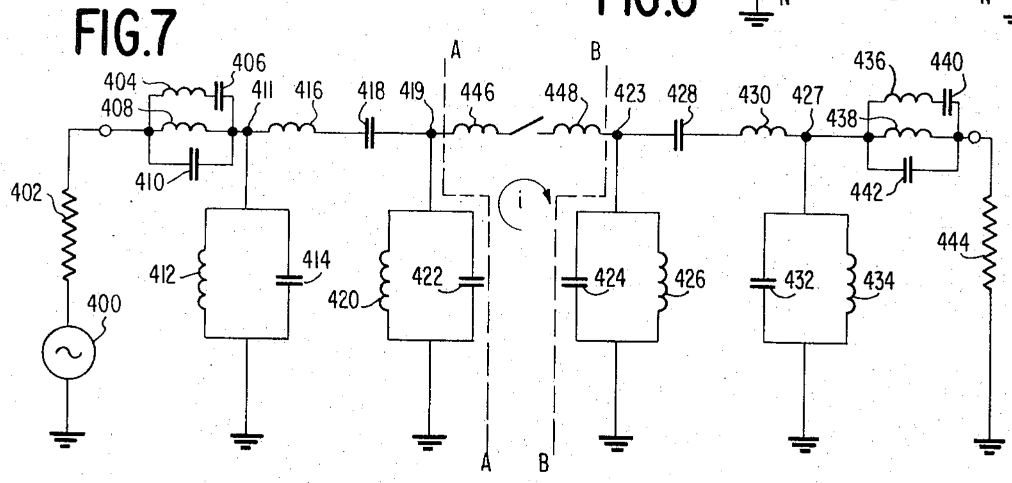
FIG. 7 shows an embodiment of this invention.

Turning now to FIG. 7, an actual embodiment of the instant invention has been shown. Those components to the left of dotted line A—A comprise an input band pass filter coupled to a source of information signals. The input filter can pass a frequency range of 44–48 kc. Those components to the right of dotted line B—B comprise an output bandpass filter connected to a load. The output filter can pass a frequency range of 48–52 kc. Representative component values will be assigned to each component shown; however, this is merely by way of example and is not meant to limit scope of the invention in any way. Many other combinations of component values for the filters may be used depending on the particular application at hand, and many other combinations of input and output bandpass filters can be interconnected by this invention.

With continued reference to FIG. 7, information signal source 400 has a characteristic impedance, shown schematically at 402, of 2,000 ohms. Inductor 404 has a value of $44.2\times10^{-3}$ henries, while capacitor 406 has a value of $274\times10^{-12}$ frarads. Inductor 408 has a value of $.330\times10^{-3}$ henries, and capacitor 410 has a value of $.0361\times10^{-6}$ farads. Joined to terminal 411 is an LC tank circuit comprising inductor 412, having a value of $.357\times10^{-3}$ henries, and capacitor 414, having a value of $.0337\times10^{-6}$ farads. Joined also to terminal 411 is a series connected inductor 416 and capacitor 418; inductor 416 has a value of $182\times10^{-3}$ henries, while capacitor 418 equals $66\times10^{-12}$ farads. A second LC tank circuit is joined to terminal 419 and it comprises inductor 420 and capacitor 422. Inductor 420 has a value of $.357\times10^{-3}$ henries and capacitor 422 has a value of $.0337\times10^{-6}$ farads. Thus, with the component values recited, those elements to the left of dotted line A—A comprise an input bandpass filter capable of passing signals in the frequency range of 44–48 kc.

With continued reference to FIG. 7, those components to the right of dotted line B—B comprises an output bandpass filter, and values will be assigned to the components. These component values will be suitable for a bandpass filter capable of passing signals in the frequency region of 48–52 kc. Connected to terminal 423 is a first LC tank circuit comprising capacitor 424 and inductor 426. Capacitor 424 has the value of $.0337\times10^{-6}$ farads, while inductor 426 has the value of $.302\times10^{-3}$ henries. Joined also to terminal 423 and extending to terminal 427 is a series connected capacitor 428 and inductor 430. Capacitor 428 has the value of $55.9\times10^{-12}$ farads, while inductor 430 has a value of $182\times10^{-3}$ henries. Joined also to terminal 427 is an LC tank circuit comprising capacitor 432 and inductor 434. Capacitor 432 has a value of $.0337\times10^{-6}$ farads, while inductor 434 has a value of $.302\times10^{-3}$ henries. Joined also to terminal 427 are inductors 436, 438, and capacitors 440 and 442. Inductor 436 has a value of $44.2\times10^{-3}$ henries, while inductor 438 has a value of $.279\times10^{-3}$ henries. Capacitor 440 equals $231\times10^{-12}$ farads and capacitor 442 would equal $.0337\times10^{-6}$ farads. The entire arrangement terminates in a load 444 having a characteristic impedance of 2,000 ohms.

The only elements not assigned values so far are inductors 446 and 448 disposed within that region formed by dotted line A—A and B—B. Mathematically, the inductance 446 should equal the inductance 448 and the relation between the two of them may be expressed by the following equation:

$$l=\tau^2/\pi^2\times C_a$$

where $\tau$=the width of the sampling pulse.

Assuming a sampling pulse width of one microsecond and the component values set forth in this example, this equation reduces to:

$$l=\frac{(1\times10^{-6})^2}{\pi^2\times.0337\times10^{-6}}$$

and this reduces to a value of $$l=3.02\times10^{-6} \text{ henries}$$

Thus, an actual embodiment of the invention described has been set forth. It shows a 44–48 kc. bandpass input filter joined to a 48–52 kc. bandpass output filter by means of a resonant transfer circuit. The operation of that circuit will be substantially as described previously.

While the invention has been particularly shown and described with reference to preferred embodiments thereof, it will be understood by those skilled in the art that various changes in form and details may be made therein without departing from the spirit and scope of the invention.

We claim:

1. A resonant transfer circuit for transferring energy entirely unidirectionally from a first bandpass filter to a second bandpass filter during time intervals $\tau$ spaced at time intervals T, where $T=1/f_s$ and $f_s$ is the sampling frequency, comprising, in combination:

a source of energy having a bandwidth which is less than $\frac{1}{2}f_s$, first bandpass filter means having a passband defined by two consecutive integral multiples of $\frac{1}{2}f_s$ and passing frequencies within said passband, said first bandpass filter means comprising a first energy storage means for transitorily storing the energy passed;

second bandpass filter means of equal bandwidth to said first bandpass filter means, and having a passband defined by two consecutive integral multiples of $\frac{1}{2}f_s$ and passing frequencies within said passband, said second bandpass filter means comprising a second energy storage means for subsequently storing transitorily the energy stored by said first energy storage means;

normally open switch means for interconnecting said first bandpass filter means and said second bandpass filter means; and timing means for periodically closing said normally open switch means during time interval $\tau$ at sampling instants which are consecutive integral multiples of $1/f_s$, for transferring entirely unidirectionally the energy stored by said first energy storage means to said second energy storage means.

2. A resonant transfer circuit for transferring energy entirely unidirectionally from a first bandpass filter to a second bandpass filter during time intervals $\tau$ spaced at time intervals T, where $T=1/f_s$ and $f_s$ is the sampling frequency, comprising, in combination:

a source of energy having a bandwidth which is less than $\frac{1}{2}f_s$, first bandpass filter means having a passband defined by two consecutive integral multiples of $\frac{1}{2}f_s$ and passing frequencies within said passband, said first bandpass filter means comprising a first energy storage means for transitorily storing the energy passed;

second bandpass filter means of equal bandwidth to said first bandpass filter means, and having a passband defined by two consecutive integral multiples of $\frac{1}{2}f_s$ and passing frequencies within said passband, said second bandpass filter means comprising a second energy storage means for subsequently storing transitorily the energy stored by said first energy storage means;

normally open switch means for interconnecting said first bandpass filter means and said second bandpass filter means; and timing means for periodically closing said normally open switch means during time interval $\tau$ at sampling instants which are consecutive integral multiples of $1/f_s$, for transferring entirely unidirectionally the energy stored by said first energy storage means to said second energy storage means;

said first energy storage means, said normally open switch means, and said second energy storage means comprising a resonant circuit tuned to a frequency of $\frac{1}{2}\tau$.

3. A resonant transfer circuit for transferring energy entirely unidirectionally from a first bandpass filter to a second bandpass filter during time intervals $\tau$ spaced at time intervals T, where $T=1/f_s$ and $f_s$ is the sampling frequency, comprising, in combination:

a source of energy having a bandwidth which is less than $\frac{1}{2}f_s$;

first bandpass filter means having a passband defined by two consecutive integral multiples of $\frac{1}{2}f_s$ and passing frequencies within said passband, said first bandpass filter means having a series connected first inductance and first capacitance, and a shunt tank circuit having a second inductance and second capacitance connected in parallel, said second capacitance comprising a first energy storage means for transitorily storing the energy passed by said first bandpass filter means;

second bandpass filter means of equal bandwidth to said first bandpass filter means, and having a passband defined by two consecutive integral multiples of $\frac{1}{2}f_s$ and passing frequencies within said passband, said second bandpass filter means having a series connected third inductance and third capacitance and a shunt tank circuit having a fourth inductance and fourth capacitance connected in parallel, said fourth capacitance comprising a second energy storage means for subsequently transitorily storing the energy stored by said first energy storage means;

normally open switch means for interconnecting said first and said second bandpass filter means; and timing means for periodically closing said normally switch means during time interval $\tau$ at sampling instants which are consecutive integral multiples of $1/f_s$, for transferring entirely unidirectionally the energy stored by said first energy storage means to said second energy storage means;

wherein said normally open switch means comprise a fifth and sixth series connected inductance; and the recited components meet the following requirements;

said second capacitance, said fourth capacitance, and said normally open switch means, comprise a series resonant circuit resonating at $f_0=\frac{1}{2}\tau$;

the capacitance of said second capacitance equals the capacitance of said fourth capacitance;

the impedance offered by said second capacitance is less than the impedance of said first inductance at $f_0$;

the impedance offered by said fourth capacitance is less than the impedance of said third inductance at $f_0$;

the impedance offered by said fifth inductance is less than the impedance of said first inductance at $f_0$;

the impedance offered by said sixth inductance is less than the impedance of said third inductance at $f_0$;

during time interval $\tau$ the charge on said second capacitance shall rise from zero to the level of the energy passed by said first bandpass filter means;

during time interval $\tau$ the charge on said fourth capacitance shall drop to zero from the level of the energy transferred to said second energy storage means; and the resonant frequency is greater than the frequency range of said first or said second bandpass filter means.

4. In a multichannel switching system employing the resonant transfer of energy entirely unidirectionally from one of a first plurality of bandpass filters to one of a second plurality of bandpass filters during time intervals $\tau$, spaced at time intervals T, where $T=1/f_s$ and $f_s$ is the sampling frequency, the combination of:

a plurality of frequency multiplexed signals, each of said signals being within a predetermined frequency band and having a bandwidth less than $\frac{1}{2}f_s$;

receiving means for receiving said plurality of frequency multiplexed signals;

a first plurality of bandpass filters, each of equal bandwidth and responsive to said receiving means for selectively accepting one of said plurality of frequency multiplexed signals and passing frequencies within a passband defined by two consecutive integral multiples of $\frac{1}{2}f_s$;

transmitting means for transmitting a plurality of frequency multiplexed signals;

a second plurality of bandpass filters, each of equal bandwidth to one another and to each of said first plurality of bandpass filters, connected to said transmitting means for selectively accepting a signal and passing frequencies within a passband defined by two consecutive integral multiples of $\frac{1}{2}f_s$;

normally open switch means for interconnecting one of said first plurality of bandpass filters to one of said second plurality of bandpass filters; and timing means for periodically closing said normally open switch means during time interval $\tau$ at sampling instants which are consecutive integral multiples of $1/f_s$ for transferring the energy stored by said one of said first plurality of bandpass filters to said one of said second plurality of bandpass filters.

5. In a multichannel switching system employing the resonant transfer of energy entirely unidirectionally from one of a first plurality of bandpass filters to one of a second plurality of bandpass filters during time intervals $\tau$, spaced at time intervals T, where $T=1/f_s$ and $f_s$ is the sampling frequency, the combination of:

a plurality of frequency multiplexed signals, each of said signals being within a predetermined frequency band and having a bandwidth less than $\frac{1}{2}f_s$;

receiving means for receiving said plurality of frequency multiplexed signals;

a first plurality of bandpass filters, each of equal bandwidth and responsive to said receiving means for selectively accepting one of said plurality of frequency multiplexed signals and passing frequencies within a passband defined by two consecutive integral multiples of $\frac{1}{2}f_s$, and each having a charge storage means for transitorily storing the energy within the signal accepted;

transmitting means for transmitting a plurality of frequency multiplexed signals;

a second plurality of bandpass filters, each of equal bandwidth to one another and to each of said first plurality of bandpass filters, connected to said transmitting means for selectively accepting a signal and passing frequencies within a passband defined by two consecutive integral multiples of $\frac{1}{2}f_s$ to said transmitting means, each of said bandpass filters having a charge storage means for transitorily storing the energy previously stored by said charge storage means in one of said first plurality of bandpass filters;

normally open switch means for interconnecting one of said first plurality of bandpass filters to one of said second plurality of bandpass filters; and timing means for periodically closing said normally open switch means during a time interval $\tau$ at sampling instants which are consecutive integral multiples of $1/f_s$ for transferring the energy stored unidirectionally between said interconnected bandpass filters.

References Cited

UNITED STATES PATENTS

| | | | |
|---|---|---|---|
| 3,118,019 | 1/1964 | Feder et al. | 179—15 |
| 3,205,310 | 9/1965 | Schlichte | 179—15 |

OTHER REFERENCES

Dahlman et al.: "Effecting Resonant Transfer," IBM, Technical Disclosure Bulletin, vol. 6. No. 1, June 1963.

Translation, German Patent No. 1,023,801, Feb. 6, 1958, pp. 1–11 and 14–16.

ROBERT L. GRIFFIN, *Primary Examiner.*